United States Patent [19]

Timsit

[11] Patent Number: 4,849,929
[45] Date of Patent: Jul. 18, 1989

[54] METHOD OF RECORDING IN A DISK MEMORY AND DISK MEMORY SYSTEM

[75] Inventor: Claude Timsit, Mareil, France

[73] Assignee: Cii Honeywell Bull (Societe Anonyme), Paris, France

[21] Appl. No.: 253,698

[22] Filed: Oct. 5, 1988

Related U.S. Application Data

[63] Continuation of Ser. No. 712,174, Mar. 15, 1985, Pat. No. 4,817,035.

[30] Foreign Application Priority Data

Mar. 16, 1984 [FR] France ................... 84 04067

[51] Int. Cl.[4] .............. G06F 13/00; G06F 11/00
[52] U.S. Cl. ................... 364/900; 364/967; 364/968; 364/970; 364/943.9; 371/10; 360/98.01
[58] Field of Search ... 364/200 MS File, 900 MS File; 360/22, 40, 47, 74.5, 97.03, 98.01, 98.03, 98.08; 369/34, 35, 49; 371/10, 11, 6, 51

[56] References Cited

U.S. PATENT DOCUMENTS

| | | | |
|---|---|---|---|
| 3,187,317 | 6/1965 | Smith, Jr. ................ | 360/98.08 |
| 3,303,482 | 2/1967 | Jenkins ................... | 360/47 |
| 3,417,377 | 12/1968 | Vietor et al. ............. | 364/900 |
| 3,449,718 | 6/1969 | Woo ........................ | 371/32 |
| 3,742,466 | 6/1973 | Hamm et al. ............. | 364/900 |
| 3,876,978 | 4/1975 | Bossen et al. ............ | 371/51 |
| 3,893,178 | 7/1975 | Sordello .................. | 360/73.02 |
| 4,164,767 | 8/1979 | Gyi et al. ................. | 360/98 |
| 4,434,487 | 2/1984 | Rubinson et al. ......... | 371/10 |
| 4,598,357 | 7/1986 | Swenson et al. .......... | 364/200 |
| 4,612,613 | 9/1986 | Gershenson et al. ...... | 364/200 |

OTHER PUBLICATIONS

Boral et al, "Database Machines: An Idea Whose Time has Passed? A Critique of the Future of Database Machines", pp. 166–187.
Ito et al, "800 Mega Byte Disk Storage System Development", Review of the Electrical Communication Laboratories, vol. 28, Nos. 5–6, May–Jun., 1980, pp. 361–367.
Davy et al, "Dual Movable-head assemblies", Research Disclosue No. 153, Jan. 1977, pp. 6 and 7.
R. L. Hoffman et al, "New Direct access storage device format and attachment", IBM Technical Disclosure Bulletin, vol. 26, No. 8, Jan. 1984, pp. 4217–4232.
Electronics International, "Single-board controller interface hard disks and backup media", vol. 54, No. 10, May 1981, pp. 160–163.
Patents Abstracts of Japan, vol. 5, No. 138 (P-78), (810), Sep. 1981, and JP 56 748807A; Ooi.

*Primary Examiner*—Eddie P. Chan
*Assistant Examiner*—Kevin A. Kriess
*Attorney, Agent, or Firm*—Kerkam, Stowell, Kondracki & Clarke

[57] ABSTRACT

A method of recording numerical information in a plurality of disk units, in which the bits of each word of numerical information are transmitted simultaneously, each bit being allocated to a unit associated with the weight of that bit in that word, and a memory system for implementing the method, including a main controller (2) provided with a selector enabling the distribution and synchronization of the information signals.

25 Claims, 10 Drawing Sheets

METHOD OF RECORDING IN A DISK MEMORY AND DISK MEMORY SYSTEM

This is a continuation of application Ser. No. 712,174 filed Mar. 15, 1985, now U.S. Pat. No. 4,817,035.

FIELD OF THE INVENTION

The present invention relates to the disk memories used particularly for recording numerical data. More especially, the invention relates to a method enabling the entry and readout of numerical data in a plurality of disks. It also relates to a memory system for performing the method.

BACKGROUND OF THE INVENTION

One problem in information systems at the present time is the difficulty of attaining a high output when transferring information to or from mass memories which are part of these systems. Particularly for high-performance computers, the system element which limits its processing capacity is, as a rule, the mass memory. The problem to be solved, accordingly, is to devise a method of recording and readout, as well as a memory system with a high information capacity and allowing a high output to or from the processing units. Hence the subject of the invention is means making it possible to realize a high-output memory of such kind, having a capacity high enough to store the enormous quantity of information required for the complex calculations for which the information system is intended. The invention can advantageously be applied to all systems capable of handling very large data bases, one example being image processing systems.

In the present state of the art, only magnetic disks provide systems having a short access time at a minimum cost per bit. However, a great number of disks is required in order to attain capacities compatible with the processing power of present-day processing units. To improve the performance of the mass disk memories, the trend at the present time is to attempt to increase the density of information and the speed of readout or entry on the disks. For example, methods of what is called perpendicular recording are now in development, which increase the density of the recorded information, but these systems are still under development and threaten to be very expensive. The same is true for optical disk memories.

The solution most commonly adopted is to use a certain number of conventional magnetic disk units on which the user distributes his files in an astute manner, each file being totally on a given disk. However, when conventional disk units are used, the information recorded on one disk always presents itself in the form of words of a plurality of bits transmitted in series. This limits the information output capable of being sent between the calculating unit and the mass memory.

OBJECT AND SUMMARY OF THE INVENTION

To solve the problem of high output and high capacity, the invention proposes a method of entering and reading data according to which bits of the same word of information are sent in parallel and synchronously between the calculating units and the various disk units. To attain this object, the invention also relates to a memory system including control means which make it possible to solve the problems of putting the method into operation.

More particularly, the subject invention is a method of writing and reading numerical data in a mass memory including a plurality of disk units, each disk unit capable of containing one or a plurality of disscs and the mass memory being controlled by at least one disk controller. Each word of numerical information comprises a plurality of bits and is associated with a logical address. The invention is characterized in that at the time of the transfer of information to or from the disk units, the bits making up one word of information are transmitted simultaneously, each bit being allocated to a disk unit associated with the weight i.e., location, of this bit in the word, in order to be written or read synchronously with the other bits of the same word at a physical address which is a univocal function of the logical address of this word of information. The physical address defines, for each disk unit, the effective location to or from which this bit will be written or read; that is, it defines the disk of this unit, in the case where the unit includes more than one unit, the number of the track of this disk and the location of this bit on that track.

The subject of the invention is furthermore a memory system including a plurality of disk units connected to the exterior by lines, e.g., a data bus, control bus and/or an address bus, characterized in that these disk units are controlled by a main controller cooperating via data lines forming a bus, an address bus, and/or control lines with a plurality of disk controllers each of which controls one disk unit including one or a plurality of disks. The invention is further characterized in that the main controller includes means for synchronizing a simultaneous transfer of the bits comprising each word of information to be written or read in these disk units and means for simultaneously commanding these disk controllers to write or read, each controller thus validated being capable of processing a single bit of this information word for each information word and of transmitting or receiving this bit via a data line connected to the main controller.

Other characteristics and details of the invention will become apparent from the ensuing detailed description of a preferred exemplary embodiment.

DESCRIPTION OF THE PREFERRED EMBODIMENT

Figure 1:
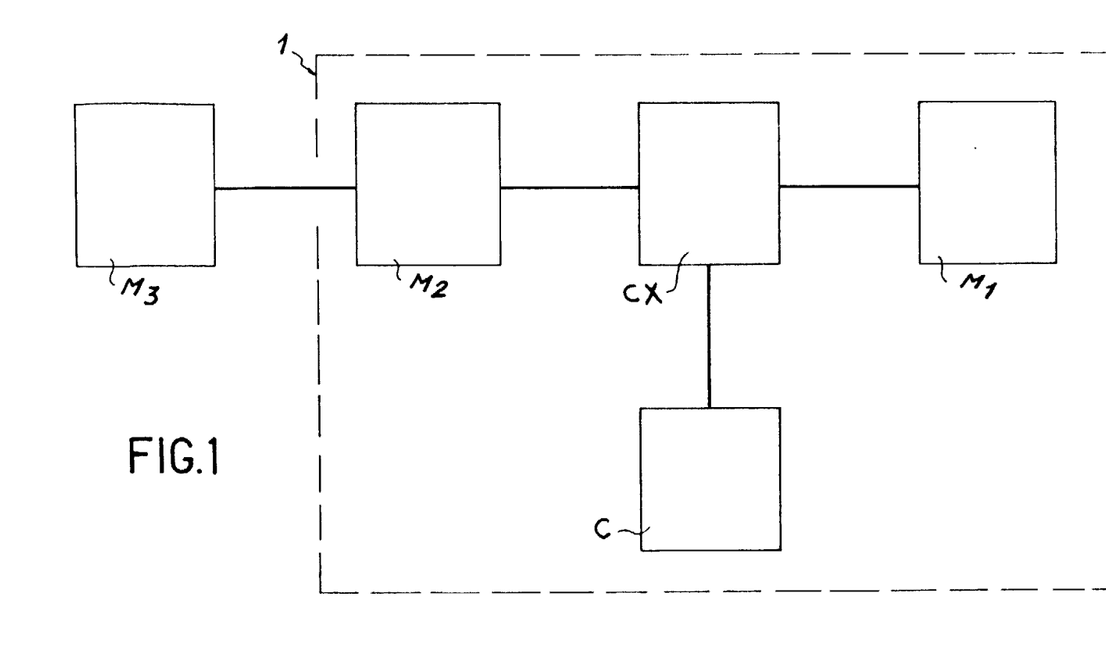
FIG. 1 shows an information system in which the method and the memory system according to the invention can be used.

FIG. 1 shows an example of an information system for the sake of better locating the invention in its context. In a highly schematic fashion, FIG. 1 shows the essential elements of an information system capable of using the memory system according to the invention, represented by the mass memory M3. This memory is linked to processing units 1 of the information system via a secondary memory M2. This secondary memory M2 is associated with an input/output control unit (not shown) which has the function of monitoring communication between the mass memory M3 and the main memory M1. The exchanges information between the mass memory M3, the secondary memory M2 and the main memory M1 as well as the information exchanges with calculating unit C are effect via a connection device Cx. The calculating unit C may be embodied by a multiprocessor system. This system is likewise associated with various conventional peripheral units, not shown. The main memory M1 normally contains the programs and the data of the programs being executed, and this is the memory consulted by the calculating unit C to obtain or sort the instructions and the data that can be executed. The seconday memory M2 essentially serves as a buffer between the mass memory M3 and the main memory M1. This secondary memory M2 is controlled by an input/output unit which is designed to assure an output larger than the relatively large blocks of data. The mass memory M3, which is the subject of the present invention, has the function of preserving the programs and the data. It must be sufficiently large to cover the needs of all the users. Its size may be on the order of 1 gigaword. To assure a minimum callup and takedown time for the data and the programs, the output of the mass memory M3 to the secondary memory M2 must be very high, on the order of 100 megabytes per second, for example.

A method of recording and reading will now be described, in conjuction with a memory system with which this objective can be attained.

Figure 2:
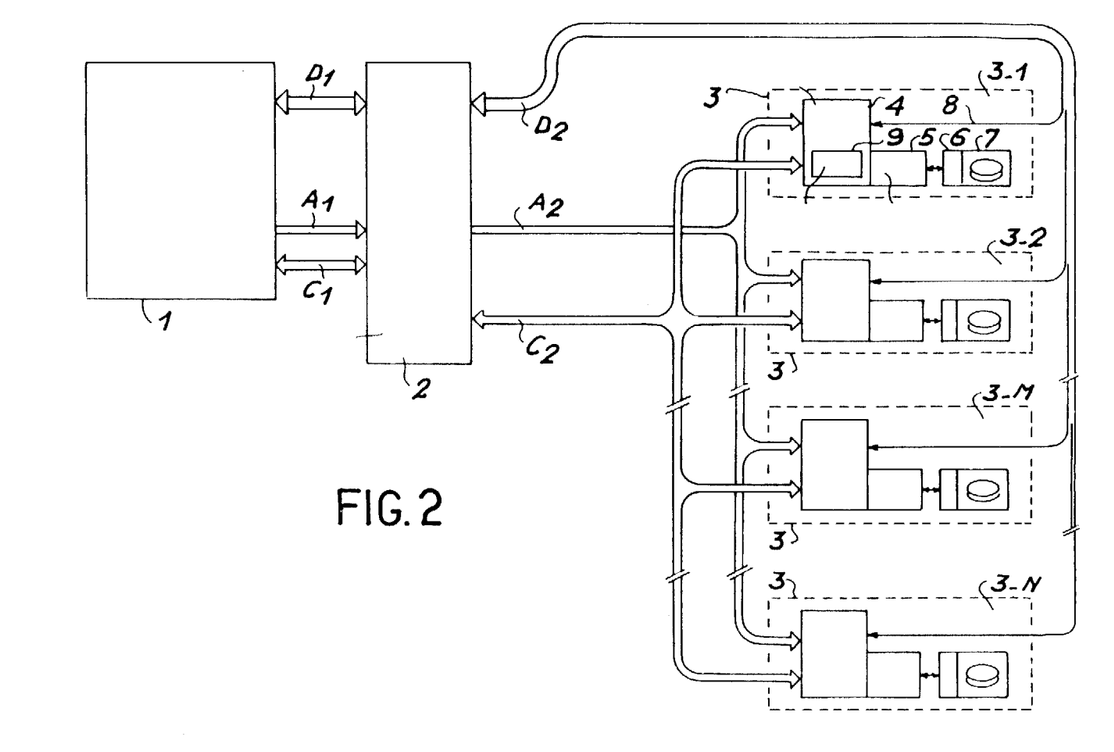
FIG. 2 is a diagram showing the entire memory system according to the invention in schematic form.

FIG. 2 shows the memory system according to the invention in greater detail. The processing unit 1 is of the type already described in conjuction with FIG. 1. The memory system M3 substantially comprises a main controller 2 and a plurality of disk units 3. The main controller 2 communicates with the processing unit 1 via a data bus D1, an address bus A1 and control lines or a control bus C1. The main controller 2 also communicates with a plurality of disk units 3 via the lines of a data bus D2, an address bus A2 and control lines or a control bus C2. As is apparent from FIG. 2, the disk units 3 all receive the same address, via the address bus A2. The command and control lines belonging to the bus C2 enable the transmission of the orders coming from the main controller 2 to the various disk units 3. Conversely, these bus control lines C2 are also intended for transmitting the signals indicative of the status of each of the disk units 3 to the main controller 2. The command signals coming from the main controller 2 are, for example, orders for writing, reading or validation. The control signals coming from the disk units 3 can provide indications as to the functional status of the corresponding disk units 3. These signals will be described in greater detail later herein. According to a particular feature of the invention, the information derived from the processing unit 1 and transmitted via the bus D1 are binary data transmitted in parallel. The main controller likewise processes these binary data in parallel, as will be seen later. At the time of writing, the main controller 2 sends binary data, also in parallel, over the bus D2. The bus D2 then branches out into a plurality of data lines 8, each of which is connected to a disk unit 3. Conversely, during the reading of information contained in the disk units 3, binary data derived from each unit are sent via the data lines 8, which are reunited to form the bus D2, and are then sent in parallel to the main controller 2. It will be understood that it is not outside the scope of the invention if the address bus A1 or A2 should be reunited with the control bus C1 or C2, respectively to comprise a combined control and address bus.

The disk units 3 substantially comprise a disk controller 4, an interface 5, a drive unit 6 and a recording medium. The disk controller 4 is also provided with a direct access memory 9. This memory, capable of acting as a preliminary or temporary memory, serves to temporarily store information being sent between the recording medium, shown in the form of disks 7, and the main controller 2. The disk controller 4 includes a programmed command unit which manages the transfer of information to or from the disks 7. The disk controller 4 also has the function of generating bits for correcting errors of the longitudinal type. Conversely, during reading from the recording medium 7, the disk controller 4 utilizes these error correction bits to correct any errors which may arise in the course of the recording or reading. The drive unit 6 is controlled by the disk controller 4 via the interface 5, which also has the function of parallel/series or series/parallel conversion of the binary data transmitted and of encoding and decoding the data signals.

The method of recording and reading performed by the memory system according to the invention can now be described.

When the processing unit 1 intends to inscribe information onto the disks, it first sends a writing command signal via the control bus C1 and address signals over the address bus A1. As a function of these signals, the main controller 2 in turn furnishes addressing signals over the bus A2 and command signals over the control lines C2 to the disk units 3 belonging to the system. Thus each disk unit receives a writing order over a control line belonging to the bus C2. Each disk unit 3 also receives information concerning the logical address of the disk which will determine the location where the information coming from the processing unit 1 will be recorded. In general, this address information is indexed when the information to be recorded arrives in the form of blocks of information, that is, in the form of a succession of words of a plurality of bits in parallel and transmitted one after another via the data bus D1. In this case, the information on the logical address of the disk to be furnished will for example represent the address of the first word of the block and the length of the block. In summary, the processing unit 1 furnishes what may be called a logical address. The main controller 2, possibly from this logical address, generates an address, known as the logical disk address, that is capable of being utilized by each of the disk units 3. As a function of this logical disk address, each disk unit 3 is capable of determining the physical address where the information that is ready to be transmitted will have to be recorded. The determination of the physical address makes it possible for the drive unit to position the reading head on the track corresponding to the physical address determined by the disk controller 4 of the unit 3. When the head is in position, the disk controller 4 sends a signal to the main controller via a bus line C2 indicating that the unit is ready to receive the data. When the main controller 2 has received such information from each of the disk units 3, the system is ready for the transfer of the information. This status is likewise signalled to the processing unit 1, and beginning at this moment the transfer of information can be effected. The role of the main controller is thus to control the transfer of information between the processing unit 1 and the various disk units 3.

To put the invention into operation, various types of disk controllers 4, associated with various types of interface, can be used. The sequence of the method will then depend partially on the disk controller 4 selected. The disk controller 4 of the unit 3 may include a memory 9 having a capacity equal to a single sector. However, it is preferable to use disk units where the memory 9 is larger. It may have the capacity of a full track, or even several full tracks. Depending on this capacity the main controller 2 will arrange or authorize the transfer of information arriving from the processing unit in blocks of information having a maximum capacity equal to one sector, or one complete track, or perhaps several complete tracks.

During the phase of writing per se, the main controller has the function of synchronizing this parallel transfer of the bits of each information word belonging to the block of information to be recorded. At the level of a disk unit 3, a block of information in the course of being recorded appears as a succession of bits in series, transmitted over the data line 8. This series of bits is recorded temporarily in the memory 9 at addresses corresponding to the order in which the bits transmitted over the line 8 appear. When the transfer of the block of information is completed, or when the maximum capacity of the memory has been attained, each disk controller 4 then initiates the process of physically recording on the disk the data recorded in the memory 9. This transfer is accompanied by the generation of longitudinal error correction bits, by a parallel/series conversion and by encoding. Finally, encoded signals are recorded on one or several tracks of a disk 7 of the disk unit 3, the number of this track being determined as a function of the physical address elaborated by the disk controller 4 as a function of the logical disk address.

When the processing unit 1 sends an order to read information, the method is performed in reverse. The processing unit 1 sends the address information of the block of information to be read over its address bus A1; in the same manner, the control lines C1 transmit the signals ordering the reading. The main controller 2, in turn, sends the logical disk address over the address bus A2 to each of the disk units 3. A signal ordering the reading, which is transmitted to each of the disk units 3, appears on the control bus C2.

In the case where the memory 9 has a large capacity, for example a plurality of tracks, it may then act as a preliminary memory; this means it is possible for the block of data addressed by the processing unit 1 to have already been inscribed in the memory 9, and in that case the disk unit 3 is already ready for reading. The disk controller 4 then sends a signal indicating that the reading can be executed immediately. If such is not the case, the disk controller 4 sends signals which command the positioning of the reading head over a track associated with the physical address corresponding to the logical disk address received via the address bus A2. The disk controller 4 then commands the transfer of the information sought, and contained in the track thus ascertained, to the memory 9. This transfer is then accompanied by decoding, by series/parallel conversion, and by a process of detection and possible correction of longitudinal errors. When the information sought has been recorded completely in the memory 9, each disk controller 4 then sends a signal indicating that it is ready for the transfer of information; from this moment, the main controller 2 signals this status to the processing unit, and the transfer of information can be effected. The main controller, because of the command signals transmitted over the bus C2, arranges the reading of each of the memories 9 belonging to different disk units 3. This causes the sequential reading, in each of the memories 9, of part or all of the data contained therein. These binary data appear on the lines 8 and are reunited to form words of a plurality of bits on the data bus D2.

An architecture such as this accordingly makes it possible to attain a high output during the transfer of information. For example, 64-bit words can be processed in parallel and in that case 64 disk units must be provided.

However, a major problem may occur if one of the disk units breaks down; this is why according to an advantageous feature of the invention a method is provided which makes it possible to overcome such an eventuality. To this end, the invention provided a certain number of supplementary disk units. In the same manner, a bit generator for correcting transversal errors is provided, under the control of the command unit of the main controller 2. Beginning with bits of information received in parallel over the data bus D1, this error correction bit generator can generate redundant bits. These bits will be added in parallel, over the data bus D2, to the bits derived from the data bus D1. A certain number of disk units will then have these error correction bits allocated to them. When writing, an analogous method to that described above is performed, but instead of simply transmitting the same bits of information over the dat bus D2 as were received from the data bus D1, supplementary bits will be generated and recorded in the supplementary disk units. Conversely, when reading, all the bits recorded in each of the disk units, including the supplementary units, are reunited in the data bus D2. The main controller 2, because of its error correction unit, can correct the errors which may have arisen during recording or in the course of reading. In that case, even if a disk unit should malfunction completely, the main controller will be able to regenerate the information as it had been transmitted during the reading process.

According to a further advantageous feature of the invention, the apparatus described above makes it possible to implement supplementary measures to increase the reliability of the system. These measures will be described herein by the term, "method of reconfiguration". The presence of means for correcting the information derived from a defective disk unit may advantageously be exploited, and according to this feature of the invention, reserve disk units are provided, which can be used to retranscribe information lost because of a defective disk unit. For example, if the means for error detection and correction include a simple generator of parity bits associated with a parity detector, the bit lost by a defective unit can be reconstituted for each word. Naturally a precondition is that it be known which unit is defective. In that case, a simple monitoring of parity makes it possible to reconstitute all the bits derived from a malfunctioning disk unit.

Other highly advanced systems enabling the detection and correction of errors also exist. Such systems are based, for example, on the use of Hamming codes. They enable the correction of one error or the detection of two simultaneous errors. With such error detectors, generating an error syndrome makes it possible to detect where the error is and to correct it, if only a single error is present.

The method of reconfiguration will then be performed as follows:

When reading, if the error detector has determined that one unit has broken down, this status is taken into account by the command unit of the main controller 2, and the command unit 21 arranges the sequence of the method of reconfiguration. This method comprises triggering a complete reading of all the information contained on all the disks of all the units. All the bits received in parallel over the data bus D2, and belonging to the same information words, enable the error detector to determine the defective disk and regenerate the correct bit. After this operation, the corrected bit can in turn be sent to a reserve disk unit. This operation is performed for all the words recorded in the mass memory. Thus the information allocated to the defective disk unit is reconstituted in its entirety and rerecorded in the reserve disk unit.

According to a variant of the invention, the disk unit 3 is provided with a controller especially adapted to the system. The presence of a memory or preliminary memory 9 having a capacity of at least one track makes it possible to accelerate the process of writing or reading on the recording medium. Since the memory 9 is a random access memory, it can be read at any address. This characteristic can be put to good use. When writing, for example, from the moment that the reading or writing head is positioned over the track being sought, corresponding to the logical disk address furnished by the main controller 2, the head furnishes a signal indicating the number of the first sector encountered by this head. This information can be taken into account by the disk controller 4, which then determines the first address of the memory 9 corresponding to the beginning of this first sector encountered. The disk controller 4 can then immediately trigger the reading of the memory 9, beginning at this first address, and can continue the reading in a cyclic sequence, so as to empty the memory completely and retranscribe the information read, in the same order, onto the recording medium. Conversely, during reading, once the reading head is in position, it can detect the first sector it eoncounters, by so informing the disk controller. The disk controller then addresses the memory 9, beginning at the address corresponding to this first sector encountered, and triggers the order for reading in the same cyclic sequence as was used during the writing process.

In another variant of the invention, it can also be provided that the memory 9 comprises two double access memories each having the capacity of one or several tracks. This arrangement makes it possible to gain time during the transfer of information when reading or writing operations are performed in succession. As a result, one of the memories, corresponding to one track, can be read or written upon under the control of the main controller 2, while the other memory, corresponding to another track, can be read or written upon under the control of the disk controller 4. Reading or writing a block of information having the dimension of one track is thus effected without waiting for all the operations performed on a preceding block to be completed.

Finally, it is also advantageous to use a disk unit 3 provided with an "intelligent" controller 4. In addition to the conventional control functions of the disk unit, such intelligent controllers, thanks to appropriate hardware and microprograms, are capable of performing a method of optimizing tracks stored in the memory 9. These controllers can for example manage the contents of a memory 9 having a capacity of six complete tracks and can determine which of these tracks must remain in priority in the memory 9. This management of the contents of the memory 9 is performed in accordance with criteria resulting to the frequency of use of each of the tracks in the memory by the information system 1 and to the time elapsed since the last time each of these tracks was used. These controllers are also capable, without external intervention, of automatically reconfiguring tracks detected as being obsolete. In that case a signal representing the reconfiguration capacities of the disk unit is available and can be exploited by the main controller 2 as will be explained below.

Nevertheless, the invention is not limited to these particular modes of realization. As will be seen below, the teaching of the invention can be applied by using conventional disk units 3, on the condition that circuits for adapting to the level of the interface of these units 3 be provided.

Figure 3:
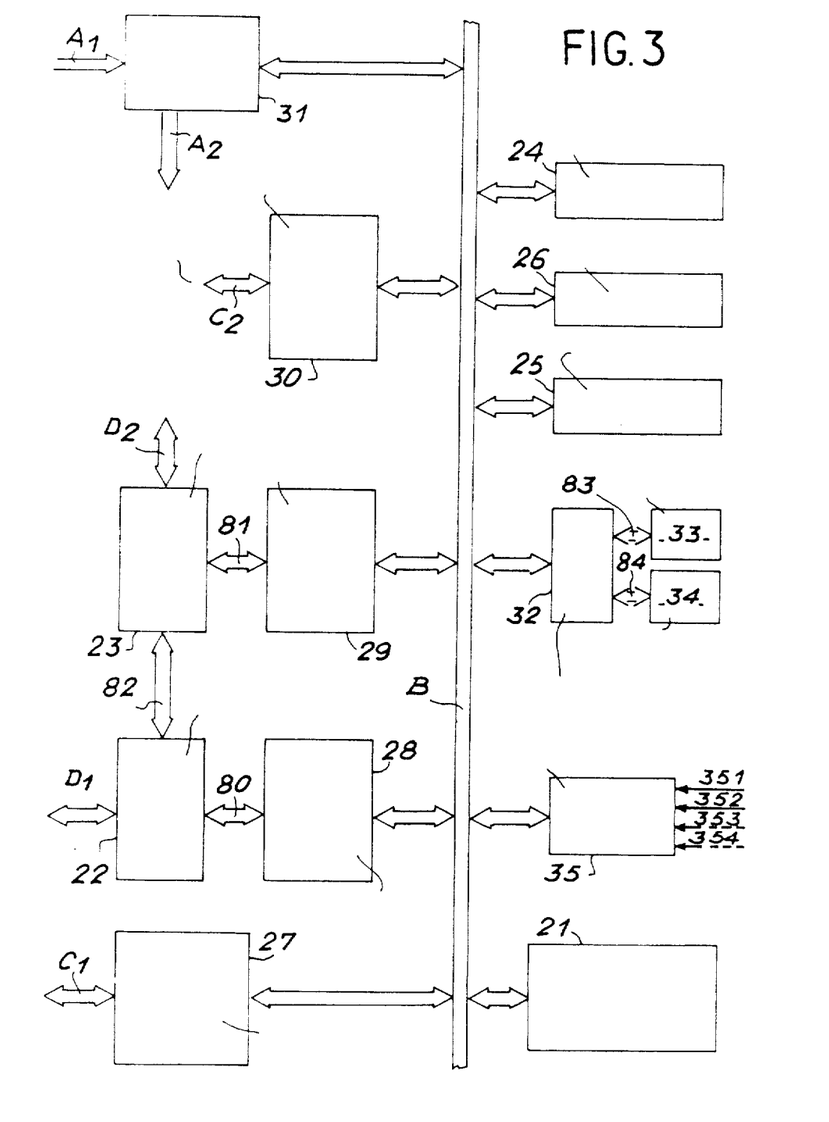
FIG. 3 shows the internal structure of a main controller according to one embodiment of the invention.

FIG. 3, in greater detail, shows the internal structure of the main controller. The main controller 2 comprises a command unit 21, which may be a microprocessor, and which communicates with the other elements of the controller via a bus assembly B in a conventional manner. This bus assembly B comprises a data bus, an address bus, and a control bus, which are not shown separately. The main controller includes a program memory 25 linked to the bus B, in which the programs enabling the processes of writing, reading and reconfiguration are recorded. A data memory 26, linked to the bus B and serving to store the data processed by the command unit 21, is also provided. Finally, another memory, called the configuration memory 24 and connected to the bus B, serves as the command unit 21, especially for effecting a reconfiguration. The precise function of this memory will be explained later herein. The command unit 21 of the main controller 2 communicates with the processing unit 1 via interface units: an address interface 31 and a control interface 27. The address interface 31 is linked to the address bus A1 as well as to the address bus A2, which is connected to the disk units 3. Depending on the type of disk units 3 used, the function of the address interface 31 is either to transmit directly, over the bus A2, the logical address received from the processing unit 1 via the address bus A1, or to adapt this address so as to make it usable for the disk units 3, or in other words to generate a logical disk address as a function of the logical address received over the address bus A1. The address interface 31 also has a major role when the method of reconfiguration is performed. This role will be discussed in greater detail later herein. The bus B of the main controller 2 communicates with the control bus C2 connected to the disk units 3 via an interface 30. A display device 33 and a control panel 34 are provided for maintenance. These elements 33, 34 are linked to the command unit 21 via the buses 83 and 84 via the interface 32. A selector 23, linked to the bus B via the interface 29, and the structure of which will be described in further detail below, has the function of selecting the data lines which will be connected to the various disk units 3. This element 23 is necessary for the functioning of the system when it is desirable to provide the possibility of reconfiguration. As a result, given that a number of disk units greater than what is necessary for recording the bits of one word in parallel is provided, this selector 23 must select the usable lines, or in other words the lines which must be effectively connected to the disk units which are not, or are no longer, reserve units.

A device for detecting and correcting errors 22 is linked to the command unit 21 via the interface 28 and the bus B. It is this device which has the function, during the writing process, of generating the error correction bits. These error correction bits will be added in parallel to the data bits for each word of information received over the data bus D1. Conversely, during a reading process this device 22 can detect the position of a possible error and can correct the error. In a particular embodiment, it will be seen that this error detector and correcting means 22 enables the detection and correction of one error, or the possibility of detecting two simultaneous errors in the same word of information.

Finally, an interruption management device 35 is provided. This device, also linked to the bus B, makes it possible to manage the interruptions caused by particular statuses that are detected or signaled, coming either from the error detector and correcting means 22 or perhaps from other units in the system signalling that an interruption is necessary.

The operation of this main controller stems from the method already described. To summarize it, during the writing process the data coming from the data bus D1 are processed by the error detection and correction device 22 where error correction bits are generated. All of these data bits and error correction bits travel via the selector 23, preselected by selection signals derived from the interface 29 and transmitted via the bus 81. As a function of these signals, the selector is positioned for switching the data bit in parallel appearing over the bus 82 to each of the disk units in operation. The bits of each word of information, as has already been described, are distributed among the various disk units of the system via data lines 8. All these operations are naturally supervised and synchronized by the command unit 21 which effects the counting of the information words transmitted.

During the reading process, the inverse of this process is performed. Data in parallel appearing on the data bus D2 are transmitted via the selector 23 and the bus 82 to the error detection and correction device 22. If no error at all has arisen, or if no error has been detected by the device 22, the data are transmitted directly over the data bus D1. In contrast, if one or more errors are detected, this status is signaled to the command unit via the interruption management device 35. Via the interface 28, the command unit 21 can recognize the type and position of the error, or rather the disk unit 3 which has brought about the error. This status can trigger the method of reconfiguration which will be performed by the command unit 21 according to a process recorded in the program memory 25. The execution of this program causes the sequential addressing, track by track, of all the tracks of all the disks of all the units. It arranges the sequence of the sequential reading of the tracks, the correction of errors and the reinscription of each bit corrected onto a reserve unit. This operation is performed under the control of the command unit 21, which sends the reading and writing signals to different units 3 and causes the modification of the address furnished to the selector 23 via the selection bus 81. More specifically, the operation of reconfiguration comprises first the simultaneous addressing of the units 3 and giving the order to read the first track of each disk via the memory 9; of generating for each word, thanks to the corrector code, the missing bit and its address; and of addressing the first track of the reserve disk unit and giving the order to write the corrected bits into the memory 9 of this unit. Subsequently the contents of the memory 9 are transferred to the recording medium of this unit. The same operation is performed for the second track, and then the next, track by track, unitl all the tracks of the disk of each unit have been exhausted.

Figure 11A:
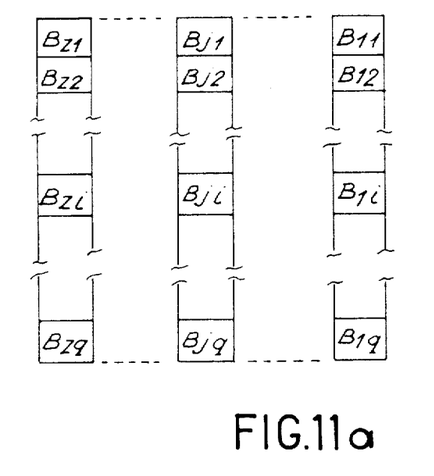
FIGS. 11a–11c show how the data bits are processed by the method according to the invention.
Figure 11B:
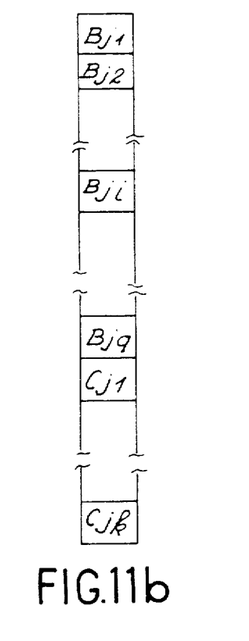
Figure 11C:
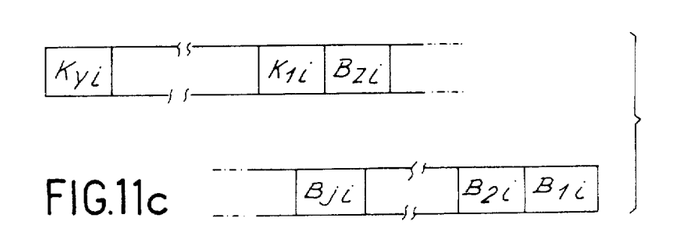

The process of writing that is implemented by the memory system will now be described in further detail, referring to FIGS. 11a, 11b and 11c. When the processing unit 1 intends to record a block of data shown in FIG. 11a, a writing signal is sent via the control bus C1 to the main controller 2. Each word of this block of information appears as a group of bits in parallel on the data bus D1. Each line of the data bus D1 corresponds to a predetermined weight or position of the bit of each word of information. For example, line i corresponds to bits having the weight or position i: B1i, B2i, ... Bji, ... Bzi. When a word of information appears at the input of the error detection and correction circuit 22, it is in the form of the group of bits in parallel Bji, Bj2, ..., Bj1 ... Bjq. The error detection and correction circuit 22 generates for each word a set of transversal error correction bits: Cji ..., Cjk. The set of these bits, that is, error correction bits and information bits, appears in parallel at the output 82 of the error detection and correction circuit. FIG. 11b shows the format of a word of information including these error correction bits. The same operation is performed sequentially for each word of the block. All the bits having the same weight, that is, those associated with the same data line of the data bus D2, will then be directed to a disk unit associated with this weight. FIG. 11a likewise shows the successions of bits transmitted via the lines 8 to the disk units 3. The disk unit i will then receive the bits B1i ..., Bji ..., Bzi in series. The controller 4 of this disk unit 3 then starts to generate longitudinal error correction bits K1i ..., Kyi, as shown in FIG. 11c, for each series of bits thus received over its data line 8. This, finally, is the group of bits which, after encoding, will be recorded onto the recording medium.

Conversely, during the reading process, each disk after decoding delivers a series of bits such as those shown in FIG. 11c. After the correction of longitudinal errors and the suppression of error correction bits, these bits are reunited in parallel to form words of a plurality of bits in parallel, such as those shown in FIG. 11b, and including the information bits and the transversal error correction bits. The device for detecting and correcting transversal errors 22, which then receives words having the structure shown in FIG. 11b, can process these bits with a view to detecting the presence of an error and correcting this error. Thus the data, possibly corrected, will be transmitted in succession in order to reconstitute the block required by the processing unit 1.

Figure 4:
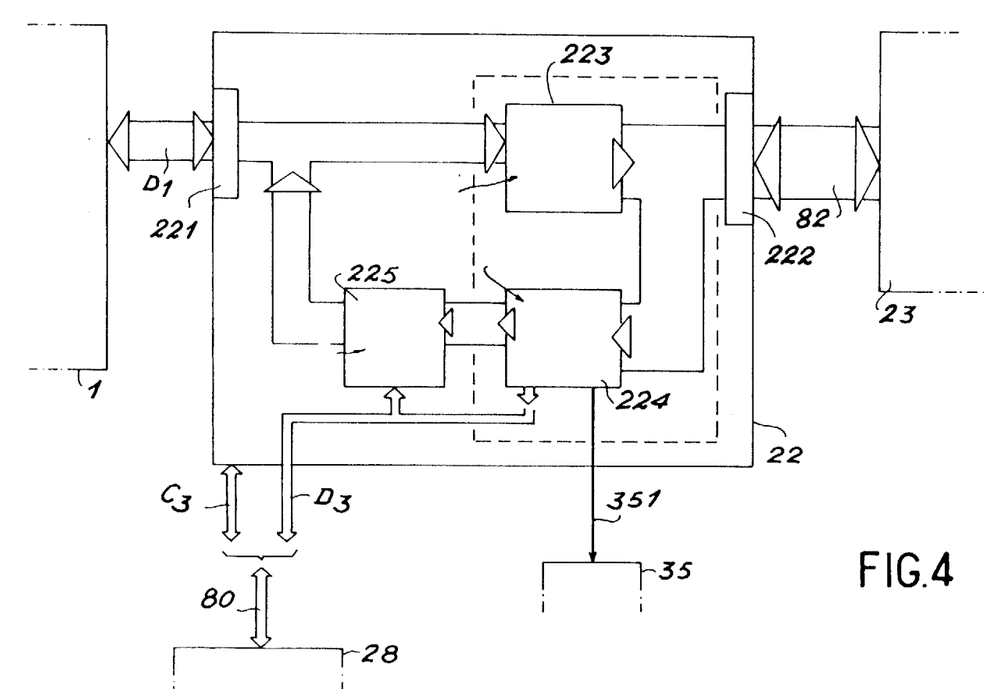
FIG. 4 shows an error detection and correction circuit which is part of the main controller shown in FIG. 3.

FIG. 4 shows, in detail, the functional elements of an exemplary device for detecting and correcting transversal errors 22, based on the utilization of Hamming codes. A buffer input memory 221 serves to store temporarily data received from the unit 1 or prior to their transfer to the unit 1. In the same manner, a buffer memory 222 serves to store temporarily data to be transmitted to the disk units 3 or arriving from these units.

During the writing process, the data arriving from the bus D1 allow the generation of the error correction bits. This operation is performed by the generator 223. At the output of this generator, the information bits and the transversal error correction bits appear in parallel.

During the reading process, the data bits appearing on the bus 82, temporarily stored in the buffer memory 222, are transmitted to an error syndrome generator 224. This generator, in the case where only a single error exists, indicates the position of this error, or in other words the weight or position in the word corresponding to the erroneous bit. In the case where two simultanous errors are found in the same word, this status is signaled via the line 351. In the case of only a single error, the position of the error is indicated at the output of the error syndrome generator 224 on the bus D3. This information makes it possible for the error corrector 225 to correct the erroneous datum. This information is also transmitted to the command unit 21 of the main controller 2. The mode of operation of the device 22 is controlled by the signals on the lines C3 of the bus 80 derived from the interface 28. These signals select the writing or reading mode and permit the synchronization of the transfer of words of a block of information under the control of the command unit 21. The data appearing on the bus D3, when there is an error, will be utilized by the command unit 21 to effect the reconfiguration of the system. The data of the bus D3 represent the weight, or position, of the defective bit and at the same time indicate which disk unit is the one which has generated this error. The command unit 21 thus determines which unit has broken down and can trigger the process of reconfiguration for retranscribing all the corrected information coming from this defective unit onto a reserve disk unit. The reserve disk unit which will be selected by the command unit 21 is determined as a function of the data contained in the configuration memory 24. It is in this memory that the status of each of the disk units is recorded, including that of the reserve disk units.

The criteria enabling a decision as to which condition requires a reconfiguration to be performed may be variable as a function of the degree of relatibility demanded of the system. One criterion for reconfiguration, for instance, may be the detection of a persistent longitudinal error. This status can be signaled directly by a disk unit 3 or by the detection of transversal errors effected by the circuit 22. The reconfiguration may also be envisaged in the case where one of the disk units 3 is approaching saturation in terms of the number of available reconfiguration tracks, if the disks selected for the system are provided with controllers 4 allowing track reconfigurations.

It is understood that when the system is in the process of reconfiguration, a signal indicating this status is transmitted to the processing unit by one of the control lines C1. The memory system is thereby declared unavailable.

In like manner, when one or more reconfigurations have been performed, the status of the reconfigured disks must be indicated. This may be done simply by actuating a luminous signal associated with malfunctioning disk units. In the case where one or more disk units have been reconfigured, luminous indicators corresponding to the display pannel 33 are lighted, and the maintenance crew will have to replace these units. Once the replacement has been done, the disk unit will be able to be used again by the system, on the condition that this new situation is signaled to the main controller via the control panel 34, which causes an updating of the configuration memory 24.

Figure 5:
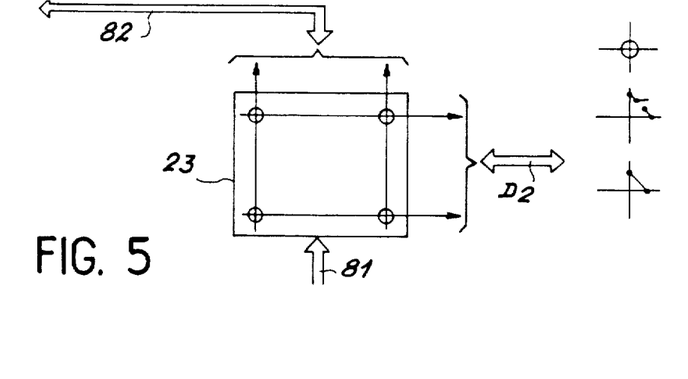
FIGS. 5–8 relate to a selector circuit for data lines which is part of the main controller shown in FIG. 3.

FIG. 5 is a diagram illustrating the principle of the selector 23 which is part of the main controller 2. This selector receives the data derived from the transversal error detection and correction device 22 via the data bus 82. This selector 23 is addressed by the selection signals determined by the command unit and appearing on the bus 81. As a function of these signals, the selector 23 positions line switches authorizing the passage of the signals coming from the bus 82 to the selected lines of the bus D2.

Figure 6:
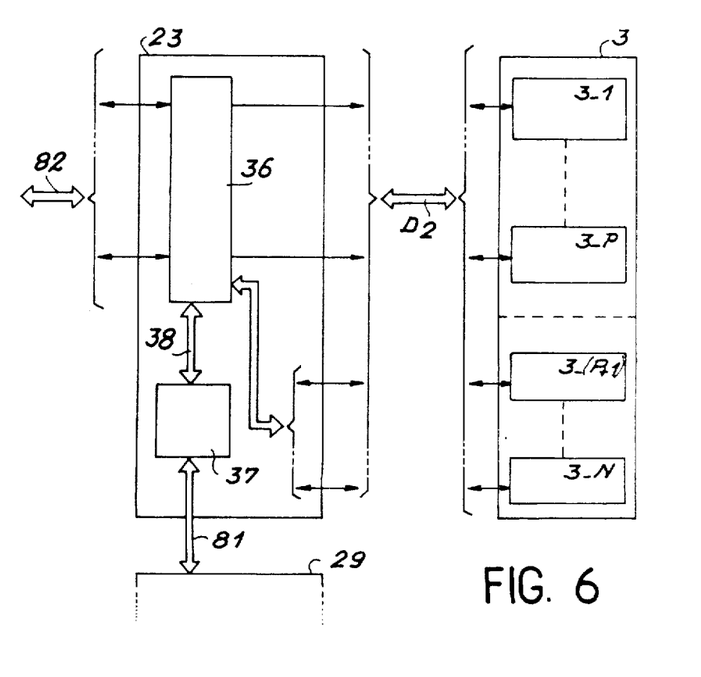

FIG. 6 shows the selector 23 of FIG. 5 in further detail. The selector 23 substantially comprises the decoding and switching circuit 36. Selection and control signals appear on the bus 38 and come from the interface 37. This interface 37 may also include a series/parallel converter, in the case where the selection signals are transmitted in series. Such a case may arise if it is desired to select a great number of disk units without however having to provide a great number of lines for the bus 81. The drawing also shows that the decoding and switching circuit 36 is linked to bus lines 82, the number of which is equal to the number of bits transmitted in parallel, including the error correction bits, and which lead from the transversal error detection and correction circuit 22. At the output of the circuit 36, the output lines branch out, being equal in number to the number of lines of the bus 82, to which is added a number of lines equal to the number of reserve disk units. These output lines of the circuit 36 comprise the bus D2. The bus D2 is subsequently subdivided to lead to each of the disk units of the system. This set of disk units 3 comprises, first, the disk units 3 that may be characterized as "normal", 3-1 . . . 3-P, and second, the reserve disk units 3-(P+1) . . . 3-N.

The operation of this selector 36 is as follows: As a function of the selection information arriving from the bus 81 and transmitted via the interface 37 and the bus 38, the selector switches 36 are positioned such that each of the input lines belonging to the bus 82 are connected to one, and only one, disk unit 3. The addressing of this selector is determined by the command unit 21 as a function of the configuration of the system retained in memory in the configuration memory 24.

Figure 7:
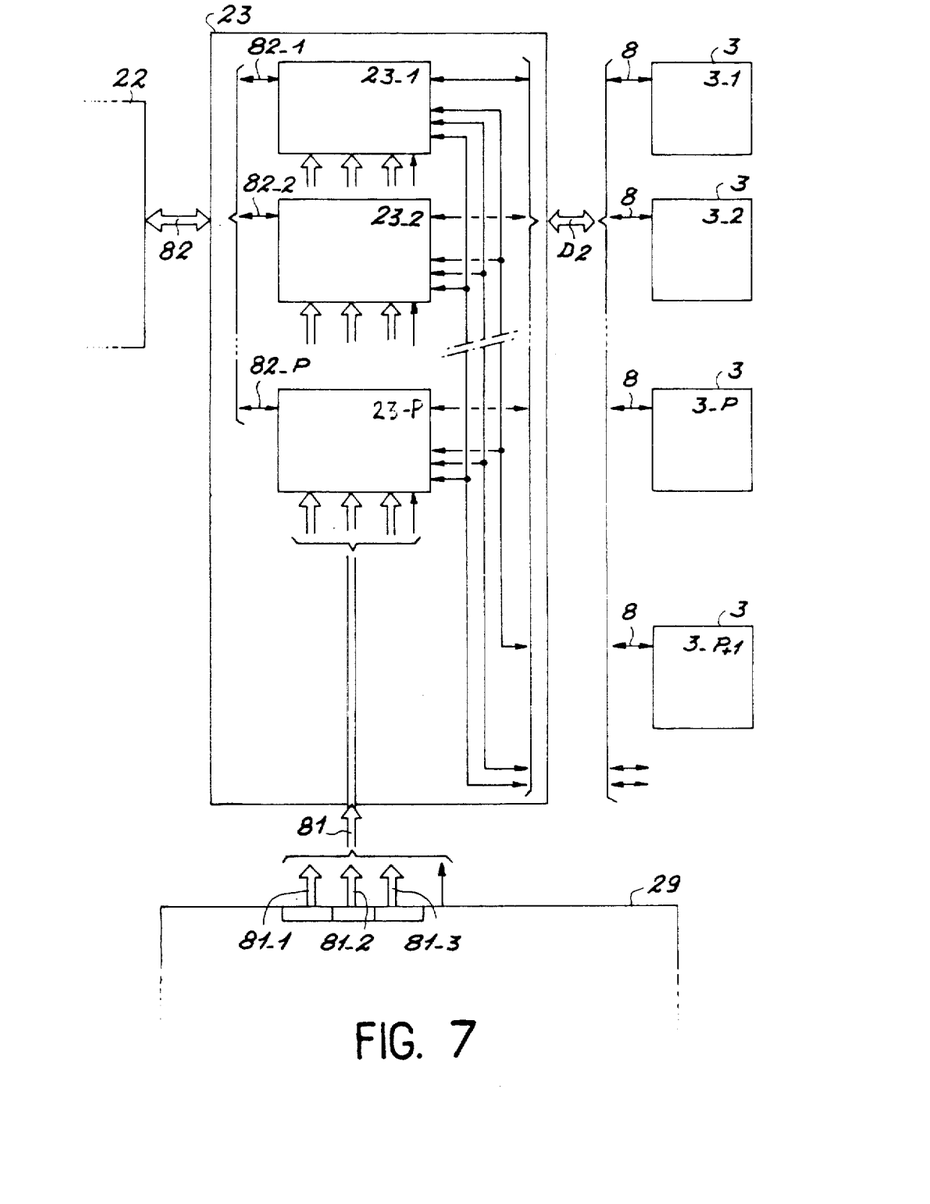

FIG. 7 shows a particular mode of realization of the selector 23 which is in essence a multiplexer or a plurality of multiplexers 23-1-23-P. In this embodiment, the reserve disk units 3-(P+1) . . . 3-N are particularized. FIG. 7 shows an example in which there are only three reserve disk units. It will be appreciated that one skilled in the art can extrapolate from this arrangement for any number of reserve disk units. In this particular case, the selection bus 81 comprises three buses 81-1, 81-2, 81-3 as well as control lines. These buses 81-1, 81-2, 81-3 are allocated to respective reserve disk units. The selector 23 also includes a plurality of selection modules or multiplexers 23-1, 23-2, . . . 23-P, the number of which is equal to the number of bus lines 82. Each selection module 23-1 . . . , 23-P is connected, first, to a disk unit 3-1 . . . 3-P associated with this selection module and, second, to each of the reserve disk units 3-(P+1), 3-(P+2), 3-(P+3). The selection is made analogously to that of the circuits in FIGS. 5 and 6, with the slight difference that the reserve disk units are particularized.

In this case, only the units 3-(P+1), 3-(P+2), 3-(P+3) can serve as reconfiguration disk units. The advantage of such a structure is that the number of selection lines of the bus 81 is limited, without necessitating a series/parallel conversion of the selection information.

As a variant of the above selection method, selection modules may also be provided which have addressable registers capable of memorizing selection signals derived from a single bus 81. In this case, the selection signals are furnished in succession to selection module registers, which makes it possible to reduce the number of bus lines 81, while maintaining an acceptable switching speed for the selector 23.

Figure 8:
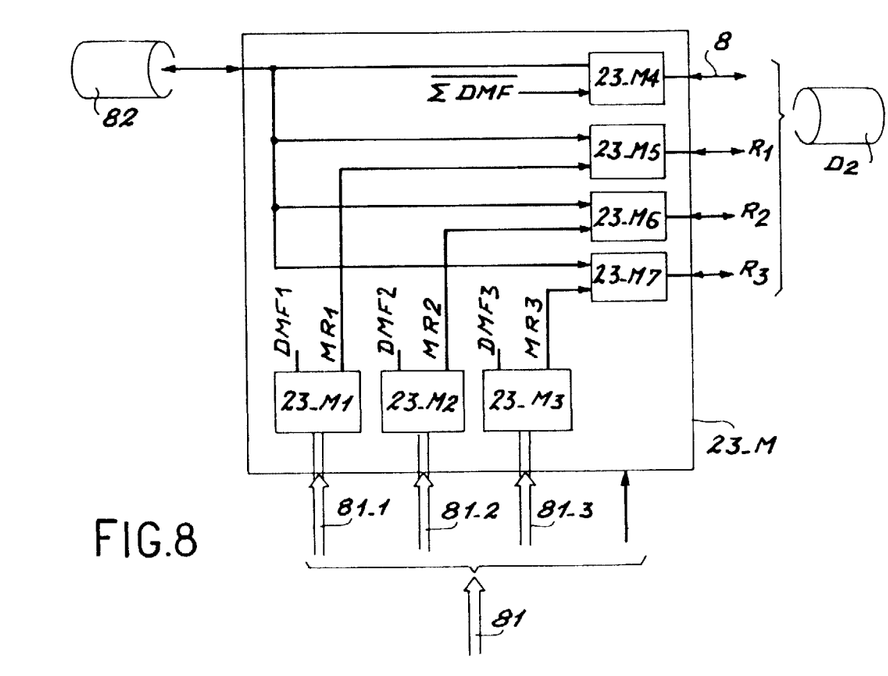

FIG. 8 shows one of the selection modules 23-M associated with the disk unit 3-M. The bus 81-1 is connected to a decoder 23-M1; the bus 81-2 is connected to another decoder 23-M2; and the bus 81-3 is connected to a third decoder 23-M3. As a function of the selection signals received via its input, one of the decoders 23-M1, 23-M2, 23-M3 can furnish to a first output a first binary signal DMF indicating that the disk unit 3-M has broken down. These signals DMF1, DMF2, DMF3, derived from the decoders 23-M1, 23-M2, 23-M3 indicate, for a predetermined logical status, which unit 3-M must be disconnected. If any one of the signals is in this status, the gate 23-M4 is ordered to open, thus preventing the transfer of signals coming from the bus 82 to the line 8 associated with the disk unit 3M. Also as a function of the selection signals appearing on the bus 81-1, 81-2, 81-3, the associated decoders furnish to their second output a signal MR1, MR2 or MR3, the status of which enables the validation of one of the gates 23-M5, 23-M6, 23-M7. When one of the gates 23-M5, 23-M6, 23-M7 is validated by the associated decoder, the signals derived from the bus 82 can be transmitted to the corresponding one of the reserve units. Thus with a reduced number of selection lines, it is possible to switch signals coming from the bus 82 either to the normal disk unit connected to the line 8 or to one of the reserve disk units connected to the lines R1, R2, or R3. It should however be noted that with such a selection module, the normal disk units cannot act as reserve disk units. As a result, when a certain number of reserve disk units have been used during the reconfigurations, the maintenance crew will have to take steps to cause these reserve disks to be rewritten onto normal disk units which will have replaced defective units. Such an operation can be performed by using the maintenance console 34. The command unit 21 can be programmed to effect the systematic reading of reserve disk units and the corresponding writing onto the replacement disk units.

Figure 9:
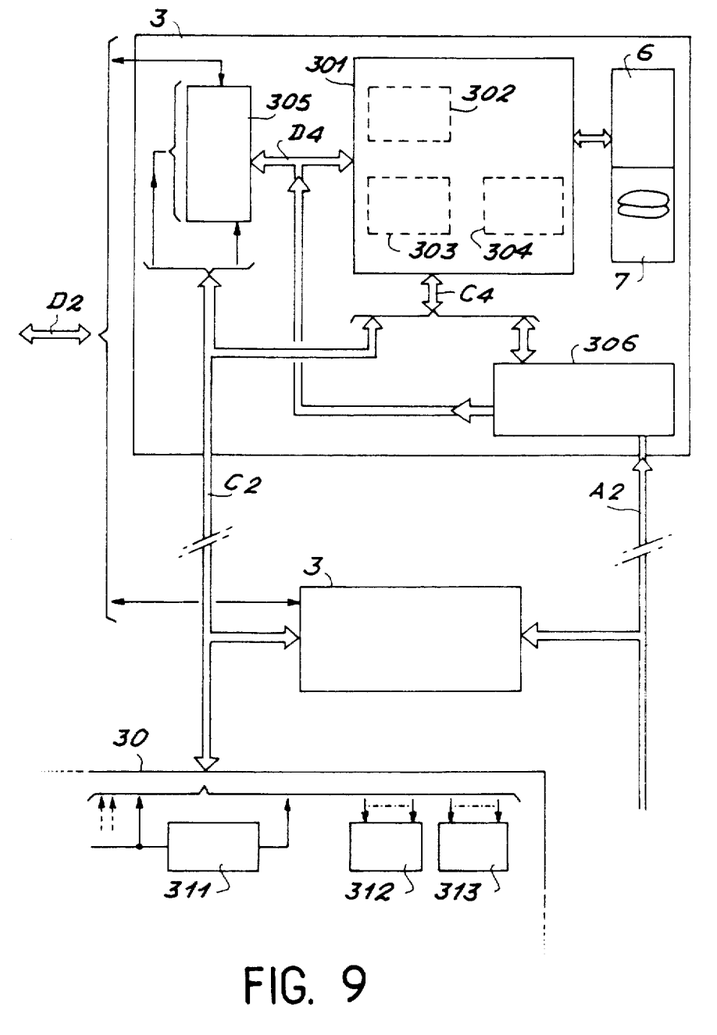
FIG. 9 describes a disk unit of the system shown in FIG. 2.

FIG. 9 shows how a memory system according to the invention can be realized by using conventional disk units which operate with 8 bits in parallel. A series/parallel converter must then be provided, which acts as the interface between the standard disk controller 301 and the main controller 2. To this end, a rapid bidirectional shift register 305, for example TTL, of 8 bits can be used. The data are transmitted in series by way of the bus line D2. This shift register 305 is controlled by control lines belonging to the control bus C2, where the command signals coming from the interface 30 are transmitted. The interface 30 includes a frequency divider 311 which divides by eight, the input of which is connected to a clock of the main controller 2 and the output of which validates the transfer of the data contained in the shift register 305 to the controller 301.

When 8 bits have been recorded in the shift register 305, in synchronism with the clock signals of the main controller, the validation signal furnished by the frequency divider 311 authorizes the transfer in parallel of information from the shift register 305 to the data bus D4 of the disk controller 301.

If the disk controllers 4 are provided for the direct reception of address signals in parallel, the bus A2 can be connected directly to the address bus of this controller. In contrast, a certain number of conventional disk controllers receive the address signals on their data bus. A controller 301 of this kind has been shown in FIG. 9. In this case, the addressing furnished to the disk controller 301 must be transmitted via the data bus D4 of this controller, and accordingly an interface 306 which receives the address information via the bus A2 and transmits, first, addressing signals via the data bus D4 and, second, control signals to the command unit of the disk controller must be provided. These control signals will be received over the internal control bus of this disk controller. Finally, each disk controller furnishes, over control lines of the bus C4, information indicating its functional status. This information is, for example, the synchronization signals indicating that the words to be read or written have been received or are ready to be transmitted. It is also via this control bus C4 that the main controller will send writing or reading orders to each disk controller. This information comes from the control bus C2, certain lines of which are connected to the control bus D4 of the disk controller 301. It is also by way of these control lines C2 and C4 that the disk controller 301 furnishes the indication that the memory 9 is full, for example during an operation in which a track of the disks is being read. Each disk controller sends such control signals, and it is only when all the control signals coming from each of the disk units indicate that all the disk units are ready that the main controller 2 will trigger the order for transfer, either for reading or writing. To do so, logical gates 312, 313 must be provided in the interface 30, the output of which gates will indicate that all the disk controllers are ready or that all the memories are full. The output of these gates will furnish synchronization signals for the main controller. Conversely, when the main controller intends to execute a writing order, it will have to transmit to each disk controller, in synchronim, a signal giving the order to write into the memories 9, at the address indicated by the signals transmitted via the bus A2.

The exact realization of the circuits described above will depend substantially on the number of disk units one wishes to control. This number of disk units in turn will dictate the choice and number of the interfaces which can be used in the main controller. For example, in the case where operation is with words of 64 bits in parallel, a total of 72 disk units will be necessary, plus reserve disk units. It will be understood that the command unit 21 cannot directly address and control all the units; this is particularly true if the command unit 21 is a microprocessor, which has a limited number of terminals. One way to solve this problem is to use programmable input/output controllers as an interface. The number of the programmable input/output controllers will depend on the number of disks which the main controller has to control.

The following elements are given as an example of how the invention may be realized: For the command unit 21, an INTEL 80 85microprocessor or its equivalent can be used; for the data memories 26, a static read-write memory, INTEL 81 55, or a dynamic read-write memory, INTEL 21 64, may be used. For the program memory 25 an INTEL 83 55 read-only memory or an electrically programmable read-only memory, type INTEL 87 55 may be used. The configuration memory 24 necessitates a relatively reduced capacity, but nevertheless this memory should not be of the volatile type. A static read-write memory powered separately by a battery can be used. Another possibility is to use an electrically alterable read-only memory having the characteristics of an INTEL 2816 A memory, for example. To realize the interfaces 27-31, programmable input/output controllers such as the INTEL 8255 model may be used. For the interruption management circuit 35, a programmable interruption controller, INTEL 8259, can be used. A model such as INTEL 8279 is perfectly suitable as the display interface 32. Finally, the error detection and correction circuit, which also has the role of generating error correction bits, can be realized with the aid of an INTEL 8206 circuit or a National Semiconductor circuit DP8400. The selector 23 can be realized using conventional logical circuits; in particular the decoders 23-M1, 23-M2, 23-M3 can be realized simply with the aid of logical gates and inverters connected to the selected inputs.

Finally, it should be noted that the invention is not limited to the example described, in which 64 bits are processed in parallel and 72 disk units are used. An apparatus according to the invention operating with only 8 bits in parallel is also conceivable. If one wishes to use a Hamming error detection and correction device, five disk units allocated to the error correction bits must be provided. Furthermore, one or more supplementary disk units will be able to be used as reserve disk units for reconfiguration.

Figure 10:
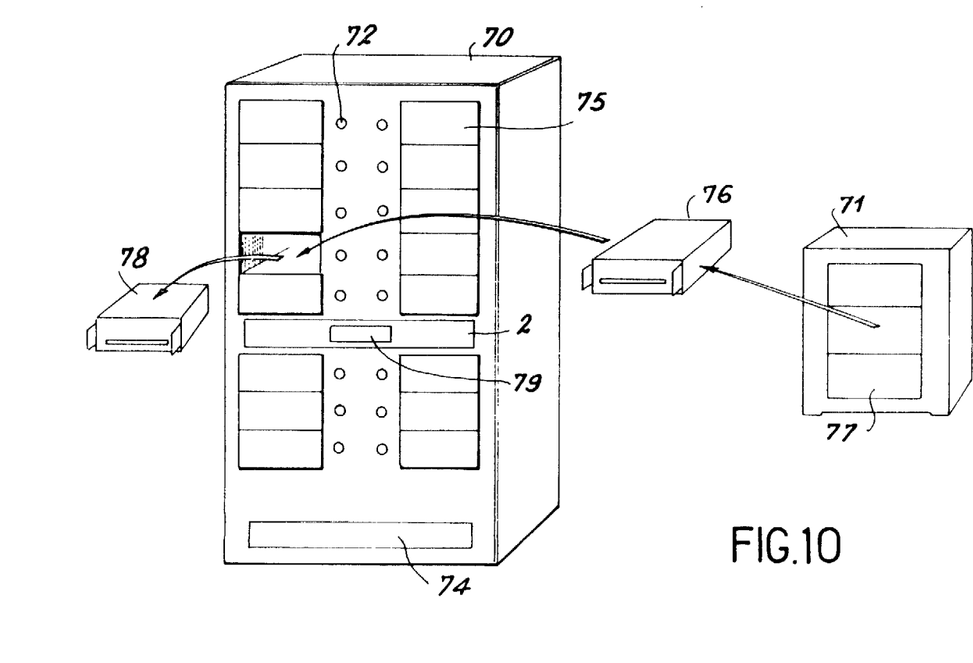
FIG. 10 represents an exemplary hardware realization of the system according to the invention.

A concrete examplary realization has been described in conjunction with FIG. 10. The group of disk units 75 has been disposed in a cabinet 70. This cabinet contains all the disk units 75, including the reserve disk units used in reconfiguration. To indicate to the maintenance crew that one or more disk units have broken down, luminous indicators 72 have been provided on the front of the cabinet. If the disk unit 78, for example, has been declared defective by the corresponding indicator, then the maintenance crew can simply remove the defective unit 78 and replace it with a spare disk 76 or 77 contained in a spare disk cabinet 71. The cabinet 70 also contains the main controller 2, a control and display panel 79 and the electrical supply of the system 74.

What is claimed is:

1. A method of storing information in and retrieving information from a memory system which includes a plurality of disk units and a controller for the disk units, the information being in the form of a sequence of words, each word comprising a plurality of information bits, the method comprising calculating from the information bits of each word associated transversal error detection and correction bits; allocating each information bit of the word and each associated transversal error detection and correction bit to separate disk units of said plurality of disk units; simultaneously transferring the bits in parallel to the allocated disk units; storing each bit in its allocated disk unit at a logical address corresponding to the word; and, upon retrieving the word, using the associated error detection and correction bits for detecting and correcting transversal errors in the word.

2. The method of claim 1 further comprising detecting a defective disk unit and, in response to a defective disk unit being detected, automatically reconfiguring the system by allocating a reserve disk unit to replace the defective disk unit; retrieving the bits stored in the defective disk unit; correcting transversal errors in the retrieved bits; and transcribing the retrieved bits after correction into the reserve disk unit.

3. The method of claim 2, wherein a sequence of words forms a block of information, and the method further comprises assigning a block address to a block of information; transferring to each disk unit a sequence of bits corresponding to said sequence of words; temporarily storing the sequence of bits in a direct access memory in each disk unit, each bit being stored at a memory address which is a univocal function of the block address and of the position of such bit in the sequence of bits; transferring the bits in series from the direct access memory to a track of a disk within the disk unit to store the bits on the track, the track having an address which is a function of the block address, a function of the memory address of a first bit transmitted to the track, and a function of the number of a first sector of the track; and wherein a word of information associated with a logical address is read, beginning at the memory address of the direct access memory after transcription into the direct access memory of the entire block of information.

4. The method of claim 3, further comprising producing a longitudinal error detection and correction bit for each sequence of bits; and storing said longitudinal error detection and correction bits along with the information bits which form said sequence of bits.

5. The method of claim 4, wherein said detecting of a defective disk unit comprises detecting transversal and longitudinal errors in a sequence of bits retrieved from the defective disk unit; and comparing the errors to a predetermined criterion.

6. A memory system for storing and retrieving information in the form of a sequence of words, each word comprising a plurality of information bits, the system comprising a plurality of disk units; a controller for controlling the disk units; means for calculating from the information bits of each word corresponding first transversal error detection and correcting bits; means for simultaneously transferring in parallel the information bits and the error detection and correction bits of each word to the disk units, each bit being allocated to a separate disk unit, and each disk unit having a disk for storing thereon the bits transferred to the disk unit; means for retrieving from the disk units information bits and corresponding first error detection and correction bits; means for recalculating from the information bits second transversal error detection and correction bits; means for comparing the first error detection and correction bits with the second error detection and correction bits; and means responsive to the comparing means for correcting transversal errors in words retrieved from the disk units.

7. The system of claim 6, wherein each disk unit includes a direct access memory for temporarily storing a sequence of bits corresponding to a sequence of words which forms a block of information.

8. The system of claim 7, wherein each disk unit comprises a disk controller, and means for enabling the disk unit to be addressed either by the disk controller or by the first-mentioned controller.

9. The system of claim 6 further comprising means for detecting a defective disk unit and means for reconfiguring the system upon detection of a defective disk unit by allocating a reserve disk unit to replace the defective disk unit.

10. The system of claim 9, wherein the reconfiguring means comprises a plurality of multiplexers, one associated with each disk unit, and wherein the controller has means for controlling the multiplexers so as to allocate and transfer to each disk unit selected bits.

11. The system of claim 9, wherein the calculating means comprises means for calculating longitudinal error detection and correction bits for a sequence of bits corresponding to the sequence of words which forms a block of information, and wherein the defective disk unit detecting means comprises means for detecting longitudinal and transversal errors, and means for comparing the errors to preselected criteria.

12. A method of storing information in and retrieving information from a memory system which includes a plurality of disk units and a controller for the disk units, the information being in the form of a sequence of words, each word comprising a plurality of information bits, each of the information bits having a weight in accordance with the position of the bit in the word, the method comprising calculating from the information bits associated error detection and correction bits; allocating the information bits and the error detection and correction bits to separate disk units, each information bit being allocated to a disk unit in accordance with the weight of the information bit; and transferring the information bits corresponding to words and the associated error detection and correction bits in parallel to the disk units so as to store each bit in its allocated disk unit.

13. The method of claim 12 further comprising detecting a defective disk unit, and automatically reconfiguring the system to replace the defective disk unit with a reserve disk unit.

14. The method of claim 13, wherein the reconfiguring comprises retrieving the bits stored on the defective disk unit, correcting errors in the retrieved bits using the error detection and correction bits and transcribing the bits on the reserve disk unit.

15. The method of claim 13, wherein a sequence of words forms a block of information, and wherein said calculating comprises calculating transversal error detection and correction bits from the information bits of each word, and calculating longitudinal error detection and correction bits from the bits of the same weight in the sequence of words forming the block, and wherein said detecting comprises detecting the defective disk unit by detecting transversal and longitudinal errors and comparing the errors to a predetermined criterion.

16. The method of claim 15, further comprising temporarily storing in a direct access memory in each disk unit a sequence of bits corresponding to the block of information, and, upon retrieving the block of information, correcting errors in the retrieved information bits using the transversal and longitudinal error and correcting bits.

17. A memory system for storing and retrieving information in the form of sequence of words, each word comprising a plurality of information bits, each information bit having a weight corresponding to the position of the bit in a word, the system comprising means for calculating for the information bits corresponding error detection and correction bits; a plurality of disk units for storing the information bits and the error detection and correction bits, a separate disk unit being allocated to each information bit of a word and to the corresponding error detection and correction bits; and means for transferring simultaneously and in parallel to the disk units the information bits of a word and the corresponding error detection and correction bits to store such bits in the allocated disk units.

18. The system of claim 17 further comprising means for detecting a defective disk unit, and means responsive to the detecting means for automatically reconfiguring the system to replace the defective disk unit with a reserve disk unit.

19. The system of claim 18, wherein said means for reconfiguring comprises means for retrieving the bits stored in the defective disk unit, means for correcting errors in the retrieved bits, and means for inscribing the retrieved bits in the reserve disk unit.

20. The system of claim 19, wherein a sequence of words comprises a block of information, and wherein said calculating means comprises first means for calculating transversal error detection and correction bits from the information bits which form a word, and second means for calculating longitudinal error detection and correction bits from the bits of the same weight in the sequence of words which forms the block of information.

21. The system of claim 20, wherein the detecting means comprises means for detecting both longitudinal and transversal errors, and means for comparing the detected errors to predetermined criteria to detect said defective disk unit.

22. The system of claim 21, wherein said detecting means comprises means operable upon detection of longitudinal and transversal errors indicative of a defective disk unit for retrying the disk unit prior to determining that the disk unit is defective.

23. The system of claim 20 further comprising a memory in each disk unit for temporarily storing bits corresponding to a block of information which are transmitted to and from the disk unit.

24. The system of claim 18, wherein the reconfiguring means comprises multiplexing means associated with each disk unit, and wherein the transferring means comprises means for controlling the multiplexing means so as to allocate the bits to particular disk units.

25. The system of claim 17 further comprising means operable upon retrieving of information from the disk units for recalculating the error detection and correction bits from the retrieved information bits, means for comparing the recalculated error detection and correction bits with the first-mentioned error detection and error detection bits retrieved from the disk units to detect errors, and means responsive to the comparing means for correcting the errors in the retrieved information bits.

* * * * *